United States Patent

Norris

[11] Patent Number: 5,507,137
[45] Date of Patent: Apr. 16, 1996

[54] GRASS CUTTING DEVICE

[75] Inventor: Roger P. Norris, Loughborough, United Kingdom

[73] Assignee: Black & Decker Inc., Newark, Del.

[21] Appl. No.: 245,107

[22] Filed: May 17, 1994

[30] Foreign Application Priority Data

May 21, 1993 [GB] United Kingdom ............ 9310526

[51] Int. Cl.$^6$ ............ A01D 34/64; A01D 34/74; A01D 34/78; A01D 69/02
[52] U.S. Cl. ............ 56/10.2 J; 56/10.2 A; 56/10.7; 56/17.1; 56/17.6
[58] Field of Search ............ 56/10.2 A, 10.2 J, 56/11.9, 17.6, 10.7, 17.1; 172/19

[56] References Cited

U.S. PATENT DOCUMENTS

| | | | |
|---|---|---|---|
| 3,381,456 | 5/1968 | Taylor | 56/10.2 X |
| 3,550,714 | 12/1970 | Bellinger | 56/10.2 A |
| 3,570,227 | 3/1971 | Bellinger | 56/10.2 A |
| 3,973,378 | 8/1976 | Bartas | 56/11.9 |
| 4,184,559 | 1/1980 | Rass | 180/131 |
| 4,887,415 | 12/1989 | Martin | 56/10.2 |
| 5,323,593 | 6/1994 | Cline et al. | 56/11.9 X |

FOREIGN PATENT DOCUMENTS

| | | |
|---|---|---|
| 2645700 | 10/1990 | France . |
| WO92/04817 | 4/1992 | WIPO . |
| WO94/08280 | 4/1994 | WIPO . |

*Primary Examiner*—Stephen J. Novosad
*Attorney, Agent, or Firm*—Charles E. Yocum; Dennis A. Dearing; Frederick H. Voss

[57] ABSTRACT

A grass cutting device suitable for automatic and unattended operation, comprises
  at least one drive wheel;
  a power unit operatively coupled to said drive wheel to propel said device;
  a cutter mechanism to cut grass over which said device passes and
  obstacle detection means capable of detecting an obstacle in the path of said device and being operably linked to said power unit to cause said device to retreat and turn away from said obstacle.

The grass cutting device preferably further comprises
  mechanical long grass detection means arranged to detect long grass in the path of said device.

9 Claims, 4 Drawing Sheets

GRASS CUTTING DEVICE

BACKGROUND OF THE INVENTION

This invention relates to a grass cutting device, in particular to a form of lawn mower for automatic and unattended operation.

Lawn mowers are widely used for the maintenance of lawns, mainly at residential homes, but also in commercial environments. Mowers were originally manually operated, relying on the user to push them along. Nowadays, the cutters are commonly powered by electrical or petrol engines, but the user must still exert a considerable force to push the mower forwards. The majority of mowers nonetheless still rely on a user to guide and operate them. This makes lawn mowing a moderately arduous and time-consuming task. For larger lawns, powered mowers may take the form of small vehicles on which the user sits. Such vehicles are expensive and only suitable for large-scale applications.

Automated mowers have been proposed in the past which are suitable for unattended operation. These may follow a pre-programmed path or may be mechanically guided, e.g. along rails buried in the lawn. Such devices are very limited in application, particularly since they are in effect dedicated to a single lawn.

There has now been devised an improved form of grass cutting device which overcomes or substantially mitigates the above-mentioned disadvantages.

BRIEF SUMMARY OF THE INVENTION

According to the invention, there is provided a grass cutting device suitable for automatic and unattended operation, the device having at least one drive wheel, a power unit operatively coupled to the drive wheel to propel the device, a cutter mechanism to cut grass over which the device passes, and obstacle detection means capable of detecting an obstacle in the path of the device and being operably linked to the power unit to cause the device to retreat and turn away from the obstacle.

The device according to the invention is advantageous primarily in that it permits automatic and unattended cutting of a lawn, yet is not dedicated by pre-programming or external guides to any particular lawn, and is therefore versatile.

The obstacle detection means most conveniently comprises one or more mechanical sensors connected via suitable switches to the power unit. Obstacles which are detected and which limit the travel of the device may be upstanding obstacles such as stones, walls, trees or posts. Alternatively, the obstacles may be the edge of a depression, e.g. at the edge of a lawn. Separate sensors may be provided for the detection of such different kinds of obstacle.

The device preferably further comprises control means responsive to the obstacle detection means to cause the device to retreat and turn away from the obstacle, the angle through which the device turns being varied in accordance with a program stored in the control means.

The power unit may have any suitable form, but is preferably an electric motor. The motor may be supplied by a battery, which is preferably rechargeable. Solar power may be used to recharge the battery, or to supplement power derived from the battery. Preferably, two drive wheels are provided which are independently operable to enable the device to turn and reverse.

The cutter mechanism may be of any suitable form, e.g. a rotary cutter, a flail cutter or a reciprocating bar cutter. For reasons of compactness and safety, the last-named is preferred.

Preferably the device is provided with mechanical long grass detection means arranged to detect long grass in the path of the device, which preferably includes a simple mechanical sensor, e.g. a suspended pivoting vane responsive to the impact of long grass. Where such long grass detection means awe provided, the cutter mechanism is preferably actuated only in response to detection of long grass, so that power consumption and noise levels are low, which means that the device can be left in operation for long periods without supervision.

BRIEF DESCRIPTION OF THE DRAWINGS

The invention will now be described in more detail, by way of illustration only, with reference to the accompanying drawings, in which.

DETAILED DESCRIPTION

Figure 1:
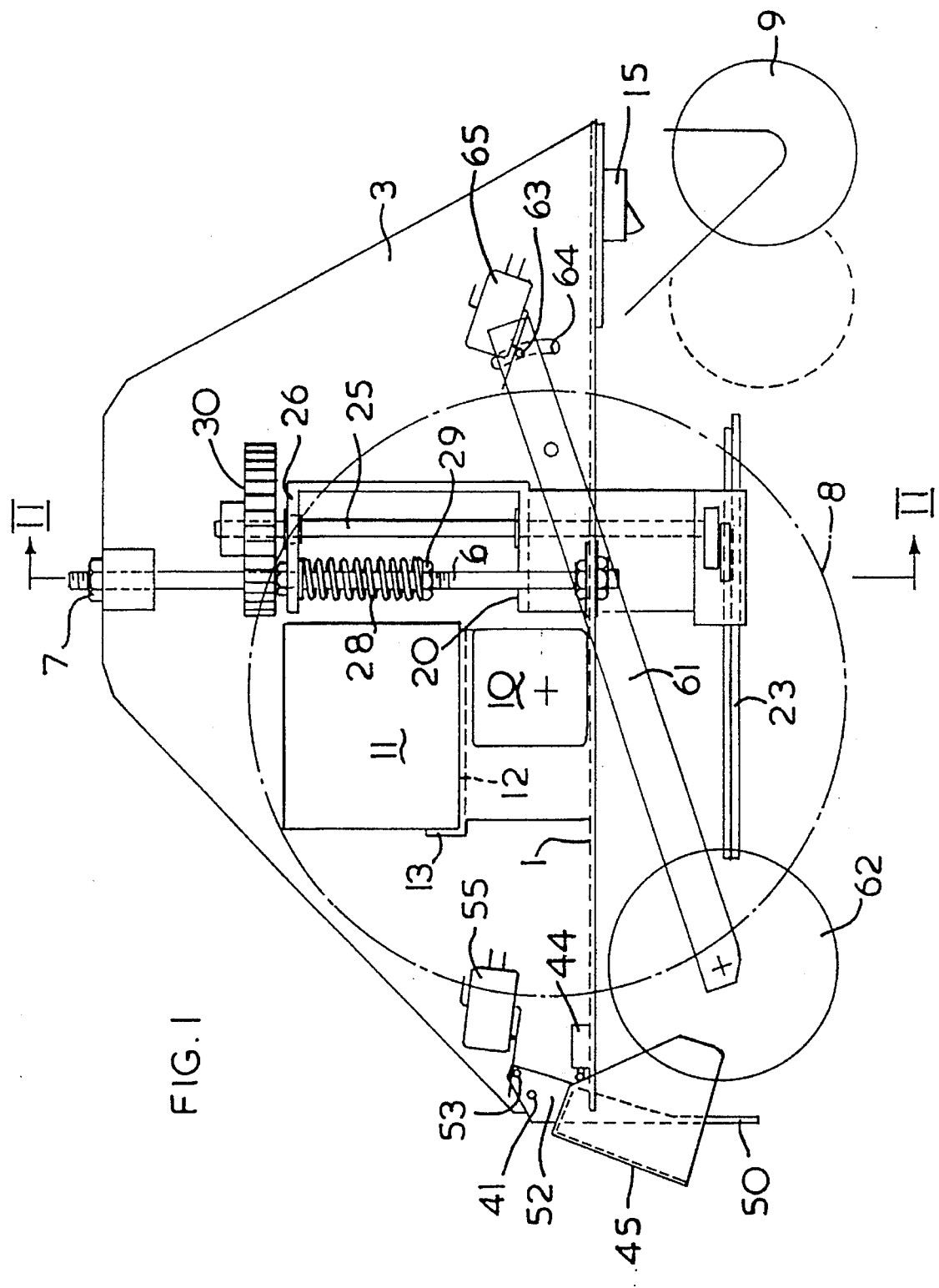
FIG. 1 is a schematic side view of a grass cutting device according to the invention.
Figure 2:
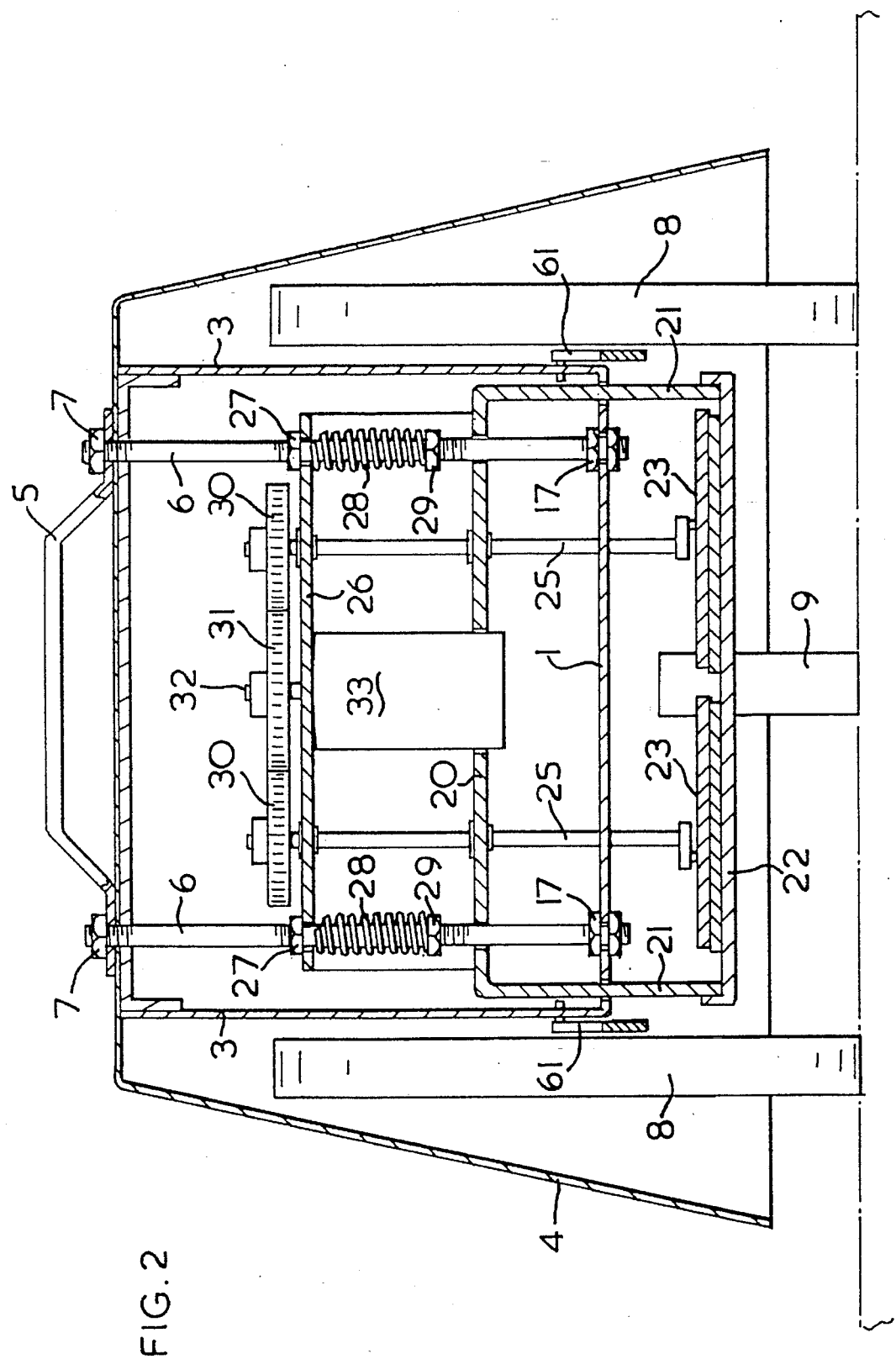
FIG. 2 is a sectional view along the line II—II in FIG. 1.
Figure 3:
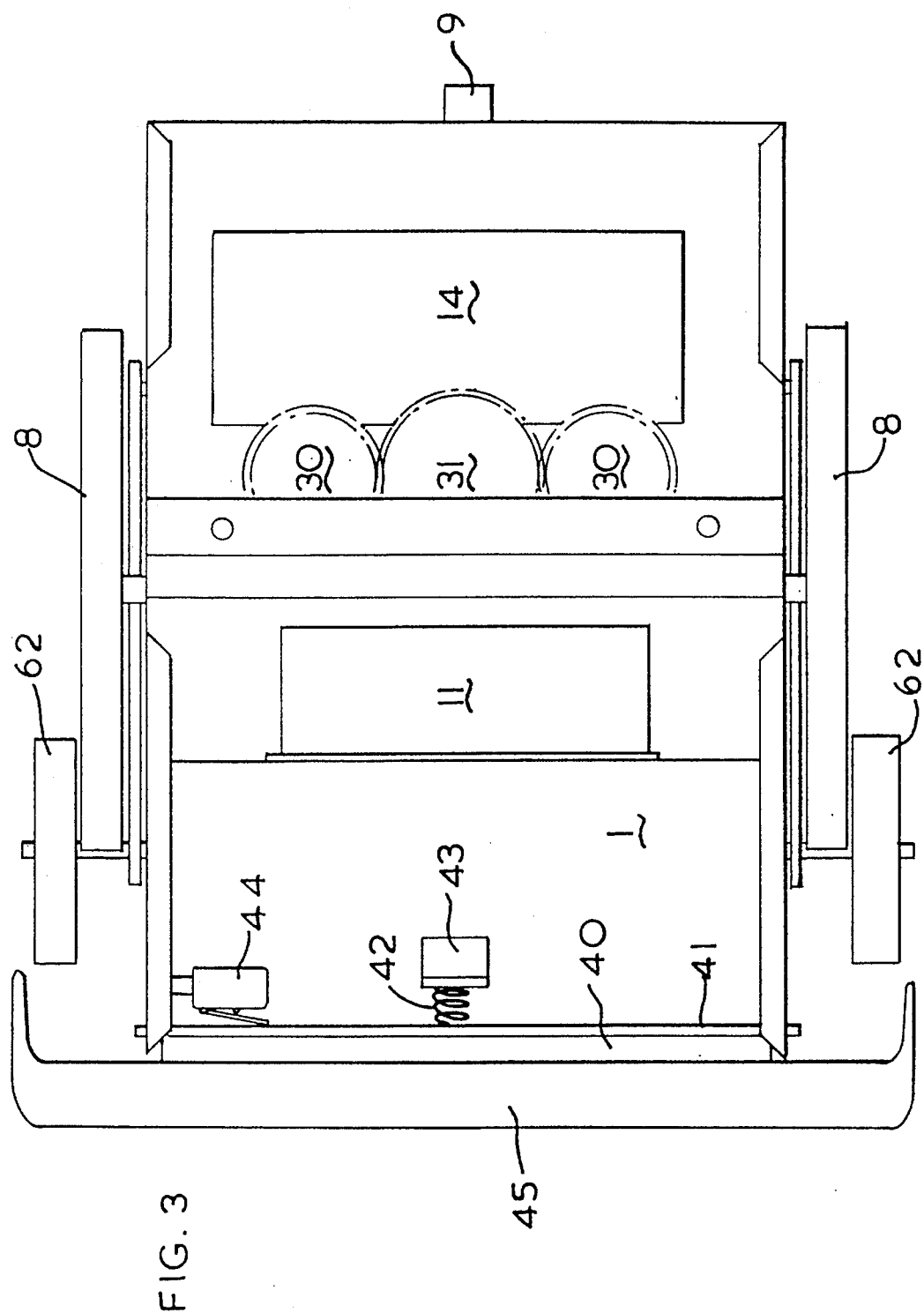
FIG. 3 is a plan view of the device of FIG. 1, with a protective cowling removed.
Figure 4:
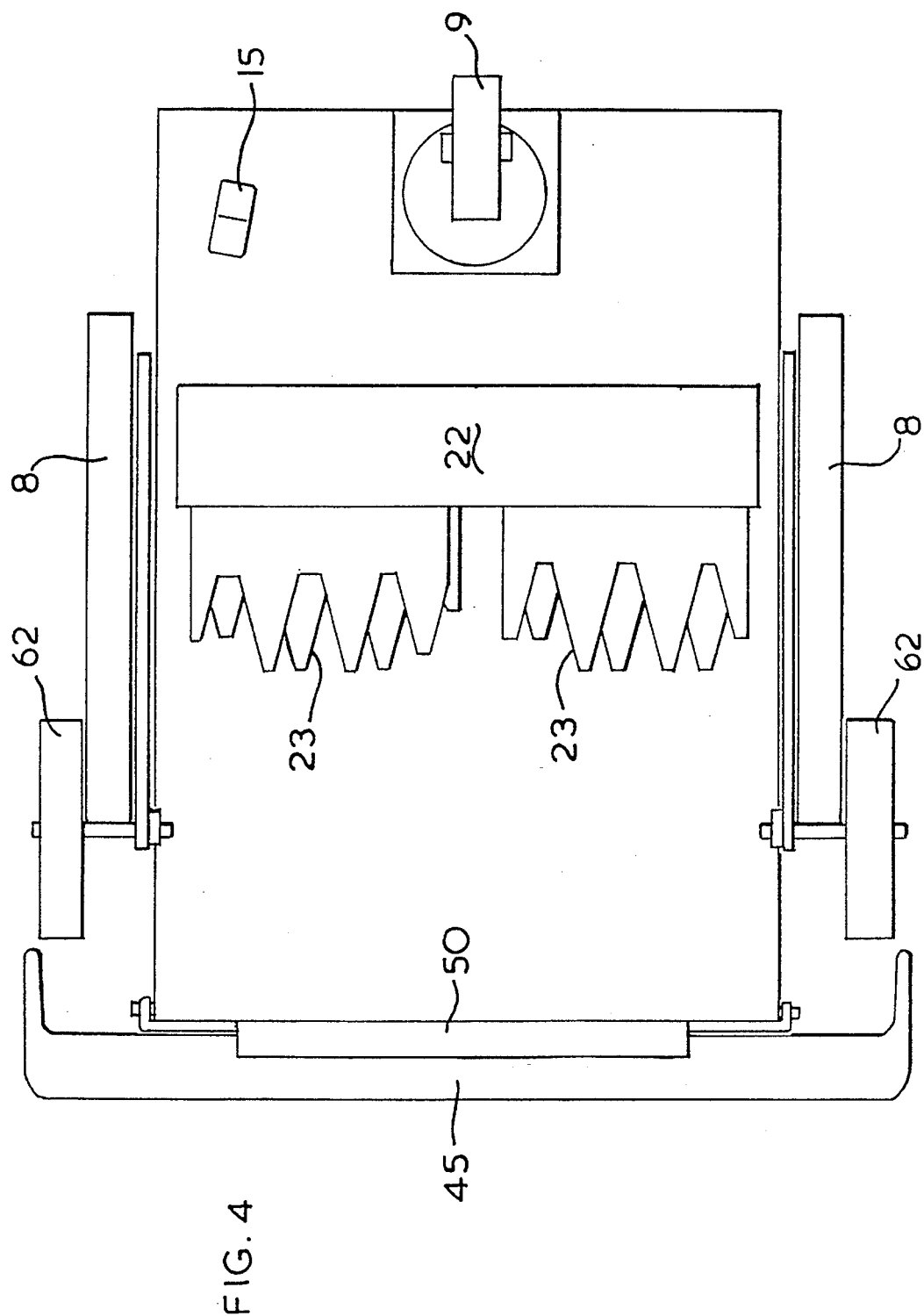
FIG. 4 is an underside plan view of the device of FIG. 1.

A grass cutting device according to the invention is a self-contained unit having a chassis formed from aluminium sheet folded to form a base plate 1 and two upstanding, generally trapezoidal side plates 3. A protective cowling 4 of plastics fits over the chassis and is secured, together with a top-mounted carrying handle 5, on two upstanding threaded bolts 6 by nuts 7. The bolts 6 are fixedly secured at their lower ends to the base plate 1 by fixing nuts 7.

The device stands on a pair of drive wheels 8 and a rear castor 9. The drive wheels 8 are individually driven by electric motors 10, which are bolted to the internal faces of the side walls 3. The castor 9 is not powered. Power for the electric motors 10 is provided by a 12 V electric battery pack 11 which is supported above the motors 10 on a support plate 12, the forward edge of which is formed into an upstanding flange 13 to prevent forward dislodgement of the battery pack 11. The battery pack 11 is connected to the motors 10 via a bank of proprietary timer relays 14 which control the motion of the device in a manner described in detail below. In a production embodiment, it is envisaged that the bank of relays 14 and associated electronic components would be replaced by a printed circuit board, e.g. utilising NE555 timer chips. The printed circuit board may also provide for under-voltage protection, e.g. automatically switching the power off if the battery voltage falls to, say, 11.7 V. This would prevent over-discharge of the battery 11, as well as ensuring reliable operation of the timer circuits and sufficient power to the motors 10 to enable the device to penetrate dense grass while cutting. An on/off switch 15 is fitted to the underside of the base plate 1 at the rear of the device.

Also supported on the base plate 1 is a cutter mechanism comprising a support plate 20, the ends of which are folded to form downwardly-depending arms 21 which pass through slots in the base plate 1. The rear edge of the support plate 20 is folded upwardly and then horizontally to form a cutter mechanism top plate 26. The threaded bolts 6 pass through apertures in both the support plate 20 and the top plate 26. The height of the cutter mechanism is adjusted by means of adjusting nuts 27 mounted on the threaded bolts 6 above the top plate 26. The top plate 26 (and hence the whole cutter mechanism) is urged upwards by compression springs 28 mounted on fixed nuts 29 on the threaded bolts 6. The cutter mechanism can be lowered by the adjusting nuts 27 against the action of the springs 28.

A cutter mechanism support plate 22 is bolted to the lower ends of the arms 21 and supports two reciprocating bar cutters 23 mounted side-by-side. Each cutter 23 comprises a fixed lower blade with forwardly protruding fingers, the lateral edges of which form cutting surfaces, and an upper blade having correspondingly formed fingers and moveable relative to the fixed blade in a cutting action. The upper blades are driven by respective eccentrically-mounted drive shaft 25 which extend upwards through apertures in the base plate 1, the support plate 20 and the top plate 26. Gear wheels 30 are mounted on the upper ends of the drive shafts 25 and mesh with a central gear 31 mounted on the upper end of cutter drive shaft 32, which is driven by a cutter drive motor 33 bolted to the underside of the top plate 26. The cutter drive motor 33 is supplied by the battery pack 11 via the bank of timer relays 14.

At the front of the device, an obstacle detector is provided. This comprises a bar 40, which is pivotally mounted on a shaft 41 passing through corresponding apertures in the side walls 3. The bar 40 is biased forwardly by a compression spring 42 which acts between the inward edge of the bar 40 and an upstanding bracket 43 bolted to the base plate 1. The inward edge of the bar 40 also bears against the pivoting arm of a first microswitch 44 which is bolted to the base plate 1 and connected to the timer relays 14.

The front of the bar 40 is bolted to a buffer 45 which extends across the whole of the front of the device. If, during forward movement of the device, an obstacle is encountered, the buffer 45 is pressed backwards (relative to the movement of the device) against the action of the spring 42 and the inward edge of the bar 40 actuates the first microswitch 44. This has the effect of causing the direction of rotation of the drive wheels 8 to be reversed for a predetermined period. First one and then both drive wheels 8 then automatically return to forward drive. The effect of switching the drive wheels 8 from reverse to forward one after the other, rather than simultaneously, is to cause the device to turn.

In another embodiment, the lower edge of the buffer 45 is radiused to reduce the likelihood of the buffer 45 becoming caught on irregularly shaped obstacles such as the surface of a rough stone wall.

Also mounted on the shaft 41, below the front of the base plate 1, is a long-grass detector bar 50. This is connected to the shaft 41 by brackets 52. One of the brackets 52 is provided with a pin 53 which protrudes inwardly through a suitably-formed slot in one of the side walls 3 and bears against the pivoting arm of a second microswitch 55 which is bolted to the internal face of the side wall 3. The lower edge of the long-grass detector bar 50 lies lower than the lower edge of the buffer bar 45 and is therefore the first part of the device to encounter long grass during forward movement or the device. The resistive force exerted by long grass is sufficient to cause the long-grass detector bar 50 to pivot backwards, actuating the second microswitch 55. The second microswitch 55 is connected to the time relays 143 and acts to switch on the cutter drive motor 33. When the long grass detector bar 50 returns to the vertical, indicating that the grass below it is short, the cutter drive motor 33 remains switched on for a predetermined period to permit cutting of grass between the cutters 23 and the long grass detector bar 50.

Movement of the device over the edge of a lawn is prevented by an edge detector mechanism comprising pivoting arms 61 mounted at each side of the device between the side plates 3 and the drive wheels 8. The forward end of each pivoting arm 61 carries an edge detector wheel 62, and the rear end carries an inwardly extending pin 63. The pin 63 extends inwardly through a suitably formed slot 64 in the side plate 3, and bears against the pivoting arm of a third microswitch 65. In the event that the device approaches the edge of the lawn edge detector wheel 62 will drop over the edge, causing the third microswitch 65 to be actuated. The third microswitches 65 are connected to the bank of relay timers 14 such that actuation of one or other of the third microswitches 65 causes the device to reverse and turn. The initiation of reversing motion is, however, delayed by the timer relays 14 to permit the device to cut right up to the edge of the lawn.

In the embodiment shown, if the device approaches the edge of a lawn at an angle which is nearly parallel to the edge, when the edge is detected and the device attempts to reverse the vertical inner surface of the edge detector wheel 62 may catch on the lawn edge and resist proper turning. To overcome this problem, in an alternative embodiment, the edge detector wheels are conically shaped, with the apex towards the centre of the device. This facilitates return of the wheel to the lawn surface when the device reverses. In order for such wheels to be accommodated, it may be necessary to extend the pivoting arms 61.

In use, the device is placed on the lawn and switched on by means on the on/off switch 15. The device then moves forward until long grass is detected by the long-grass detector bar 50, in which case the cutters 23 are actuated, or until an obstacle is encountered by the buffer 45 or an edge by an edge detector wheel 62. As described above, when an obstacle such as an edge is encountered the device turn is determined by the timer relays 14 and may have one of two values. During a first phase of operation the angle has one value, and during a second phase of operation the angle has a second, each phase lasting, say, thirty minutes. During the first phase the angle of turn may be, say, 160°, and during the second phase 50°. This mode of operation reduces any tendency for the device to repeatedly traverse the same path. The device thus travels over the lawn surface in a generally random path, cutting any long grass which it encounters. The effect of the device is to maintain the grass generally short, much in the manner of a grazing animal.

I claim:

1. A grass cutting device suitable for automatic and unattended operation, the device comprising:

at least one drive wheel;

a power unit operatively coupled to said drive wheel to propel said device;

a cutter mechanism to cut grass over which said device passes;

an obstacle detection means capable of detecting an obstacle in the path of said device and being operably linked to said power unit to cause said device to retreat and turn away from said obstacle; and a suspended pivoting vane which detects long-grass and is responsive to the impact of long grass.

2. A grass cutting device suitable for automatic and unattended operation, the device comprising:

at least one drive wheel;

a power unit operatively coupled to said drive wheel to propel said device;

a cutter mechanism to cut grass over which said device passes;

an obstacle detection means capable of detecting an obstacle in the path of said device and being operably linked to said power unit to cause said device to retreat and turn away from said obstacle; and a mechanical long-grass detection means which is arranged to detect long grass in the path of said device and to activate the cutter mechanism in response to the detection of long grass.

3. A grass cutting device according to claim 2, wherein said obstacle detection means includes means for detecting the edge of a depression in the path of said device.

4. A grass cutting device according to claim 2, said device further comprising control means responsive to said obstacle detection means to cause said device to retreat and turn away from the obstacle, the angle through which said device turns being varied in accordance with a program stored in the control means.

5. A grass cutting device comprising:

a base plate;

two generally trapezoidal side walls attached to said base plate;

two individually driven drive wheels connected to said side walls;

a power unit operatively coupled to said drive wheels to propel said device;

a cutter mechanism to cue grass over which the device passes;

a shaft which passes through said side walls;

a buffer mounted on the front of the device;

a first microswitch which is operatively associated with said buffer and said power unit;

wherein an obstacle in the path of the device is detected by contacting said buffer thereby actuating said first microswitch and causing said device to retreat and turn away from the obstacle;

a long-grass detector bar pivotally suspended from said shaft and pivotally responsive to impact with long-grass;

a second microswitch operatively associated with and activated by said long-grass detector bar; and a cutter drive motor for driving said cutter mechanism which is switched on by activation of said second microswitch such that the cutter mechanism is only engaged when long-grass is detected.

6. The device as claimed in claim 5, wherein said buffer has a lower edge which is radiused to reduce the likelihood of said buffer becoming caught on irregularly shaped obstacles.

7. The device as claimed in claim 5, wherein activation of said first microswitch causes the direction of rotation of said drive wheels to be simultaneously reversed for a predetermined period, then said drive wheels are non-simultaneously returned to a forward direction, causing the device to turn.

8. The device as claimed in claim 5, said device further comprising:

at least two pivoting arms mounted at each side of the device between said side walls and said drive wheels;

an edge detector wheel mounted on the forward end of each pivoting arm;

third microswitches operatively connected to and activated by said at least two pivoting arms when said edge detector wheels detect an edge;

wherein activation of any of said third microswitch causes the device to reverse and turn thereby avoiding going over the edge.

9. A grass cutting device as claimed in claim 5, further comprising:

a bar pivotally mounted on said shaft;

said bar being connected to said buffer;

a compression spring forwardly biasing said bar;

said first microswitch contacting said bar;

such that an obstacle contacting said buffer pushes said buffer and bar backward against said compression spring and said bar activates said first microswitch.

* * * * *